Jan. 30, 1962    N. C. HARNOIS    3,019,429
SEARCH RADAR SYSTEMS
Filed March 3, 1954    4 Sheets-Sheet 3

INVENTOR.
NELSON C. HARNOIS
BY George C. Sullivan
Agent

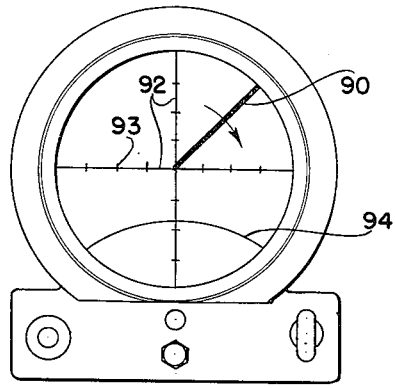
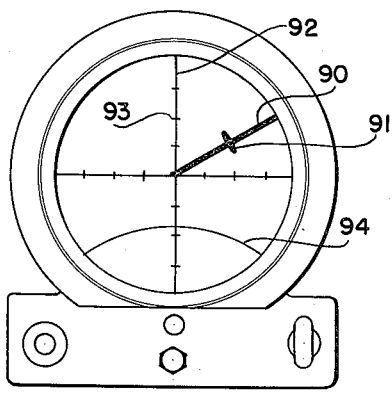
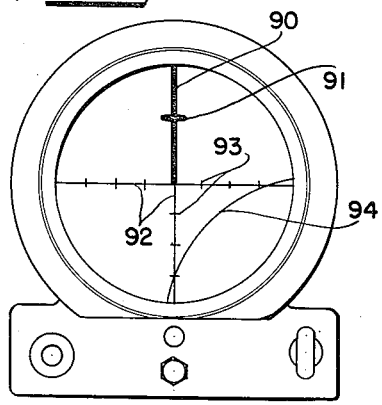
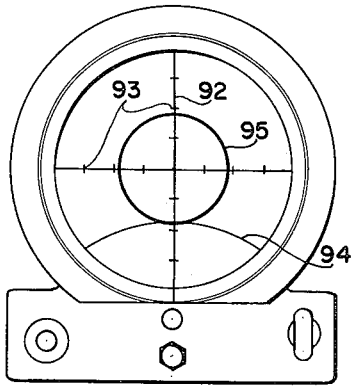
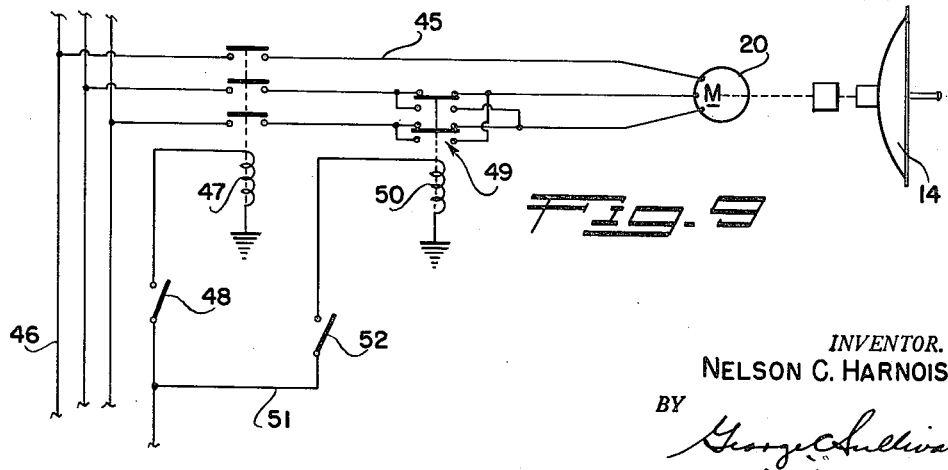
INVENTOR.
NELSON C. HARNOIS
BY
Agent

3,019,429
SEARCH RADAR SYSTEMS
Nelson C. Harnois, La Canada, Calif., assignor to Lockheed Aircraft Corporation, Burbank, Calif.
Filed Mar. 3, 1954, Ser. No. 413,768
8 Claims. (Cl. 343—11)

This invention relates to radar equipment and relates more particularly to searching and tracking radar systems for use on high velocity fighter aircraft and other high speed vehicles.

In air-to-air, sonic and supersonic fighter combat it is desirable, if not mandatory, to increase the range of detection of hostile targets as much as possible. Experience at sonic speeds of flight of the present day fighters has established that it is extremely difficult for the unaided human eye to detect an enemy target soon enough to carry out a successful attack upon the same. It has been determined that unaided visual detection of enemy fighter targets at distances much greater than 8000 yards is unlikely. Therefore, in supersonic air-to-air combat it is imperative to provide appropriate means to supplement the pilot's visual range in order that his fighter craft may be maneuvered to a favorable position with respect to the target to thereafter effect a successful visually guided attack upon the same.

Optimum aeronautical performance from the speed of flight standpoint is mandatory in high velocity fighter and intercepter aircraft. However, the automatic radar tracking and fire control systems that have been heretofore introduced are extremely heavy and bulky and, therefore, impose such severe penalties on this performance that they cannot be tolerated in certain aircraft. The systems heretofore introduced when fully complemented are operatively essential to their fullest extent only under inclement weather conditions. Since a very large majority of combat missions are flown in daylight, and at night with fairly good visibility, a smaller, less complicated and, therefore, lighter in weight radar search system is not only practical but can be utilized successfully on many types of fighter craft.

It is an object of the invention to provide a simple, lightweight, and yet thoroughly reliable search radar system useful on high velocity fighters and other high speed vehicles. The radar system of the invention is much less complicated than the present day fully complemented search radar systems and is, therefore, less costly and the system of the present invention weighs only approximately one-third as much as the earlier or present day systems. The simplification and material reduction in weight particularly well suits the system for employment in the high performance fighter aircraft and the like.

Another object of the invention is to provide a radar system of this character that includes or employs a unique dependable and convenient visual detection and display system to facilitate detection and tracking of targets to the range of ready direct visual detection without in any way adversely affecting the pilot's ability to control and fly his airplane. Subsequent to the direct visual detection of the target terminal tracking and firing may be accomplished by a suitable optical computing sight. Furthermore, an infra-red detecting and tracking unit may be integrated or combined into the sighting system to provide for accurate blind firing and/or night firing. Additionally, the radar search and detection system of the invention preferably may, if desired, include an aural detection means to be used in conjunction with the visual display means. Target detection is accomplished by pilot monitoring of a daylight-type cathode ray storage tube indicator and, if desired, an aural tone may be supplied to his radio head phones to a speaker, or the like.

Another object of the invention is to provide a radar system of this class that presents or provides detection information on the cathode ray tube indicator including the simultaneous display to the pilot of the range, approximate direction of flight and approximate altitude of flight of the target. With these three elements of information the pilot is enabled to maneuver his airplane so as to track the target to the relation or range of direct visual and/or infra-red detection so that further tracking and final weapon contact may be effected visually or with the infrared detection information.

Another object of the invention is to provide a radar system of this type that does not employ or require the so-called "lock-on" of the target or the automatic tracking equipment and circuits required in the systems heretofore introduced, thereby greatly simplifying the equipment and circuitry and avoiding, to a considerable degree, the possibility of the enemy jamming the equipment. Further, where the system is not locked on the target it continues to scan or search through its full field of radar search coverage so as to reveal the presence of additional enemy craft that may be in the vicinity and/or the presence of friendly craft thus materially aiding the general combat maneuver.

It is another object of the invention to provide a radar system of the character described wherein the radar may be locked onto the target in respect to range only after the tracking maneuver has resulted in bringing the target within direct visual range and the locked-on range information is thereupon supplied to the sight mechanism. The system may be readily restored to the target searching condition by simply operating a switch on the control indicator.

A further object of the invention is to provide a radar search system wherein the target is represented on the tube or indicator as a "flying" object, the representation being such that the approximate range, altitude and azimuth of the target are indicated until such time as the pilot brings his craft to the position where the target is approximately on the center-line of the pilot's airplane, whereupon the representation automatically changes into a circle centralized on the tube. As the range reduces this circle shrinks until the pilot can directly visually see the target at a range of, say, 3 or 4 miles.

It is a still further object of the invention to provide a radar system of the class mentioned that is simple and inexpensive to construct and install and that is extremely easy to operate and control.

Other objectives and features of the invention will become apparent from the following detailed description of a typical preferred embodiment as illustrated in the accompanying drawings wherein:

FIGURES 5, 6, 7 and 8 are front or plan views of the cathode ray tube indicator illustrating the various phases of target presentation during the tracking of a target; and FIGURE 9 is a schematic wiring diagram of the reversing control circuit for the antenna drive motor.

The radar system of the present invention may be said to comprise, generally, an antenna means 10, a transmitter and receiver group 11, and a cathode ray tube control group or system 13.

Figure 1:
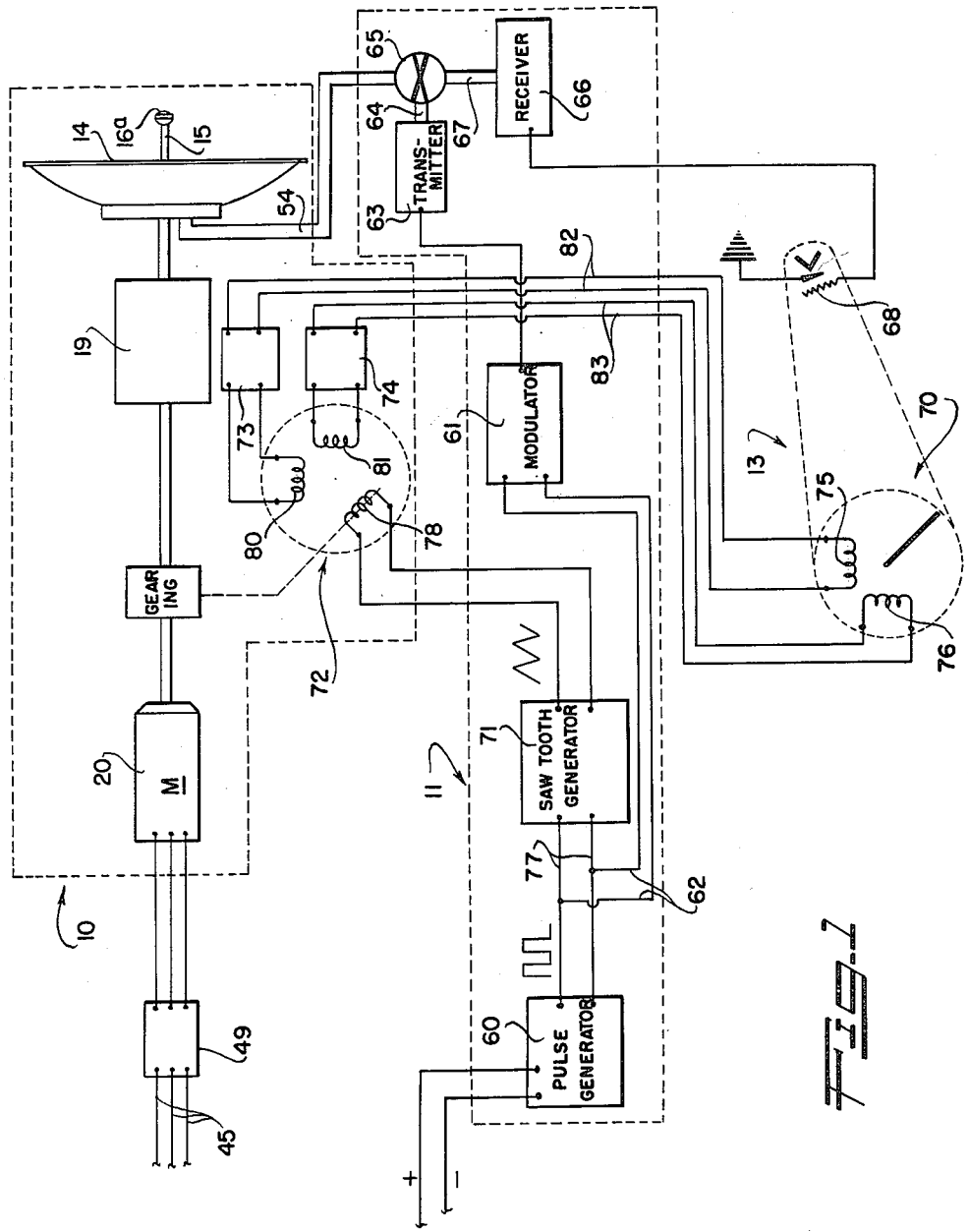
FIGURE 1 is a schematic or diagrammatic view of the system of the invention.
Figure 2:
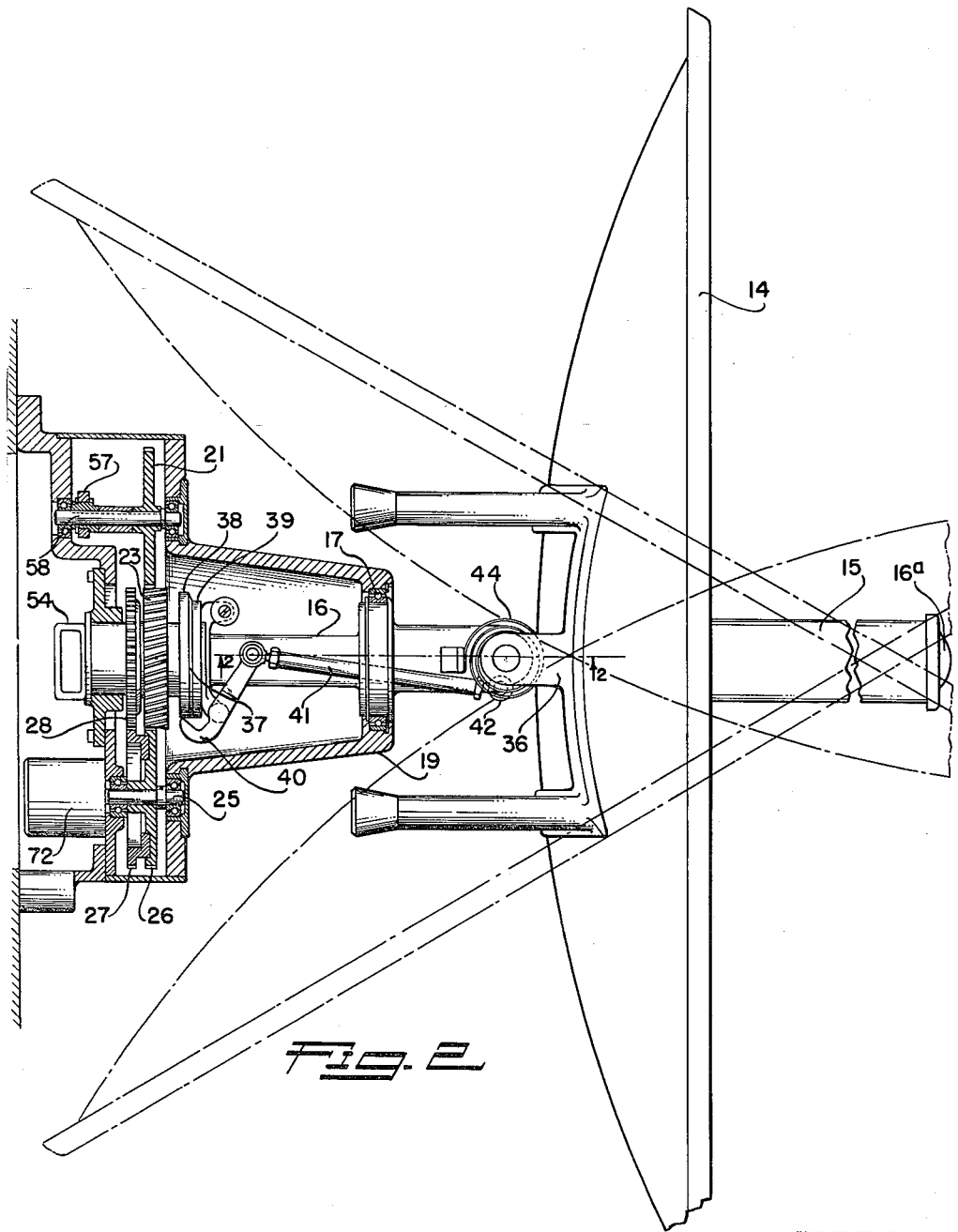
FIGURE 2 is a side elevation of the antenna, a portion of the antenna drive and nodding mechanism appearing in transverse cross section and extreme angular positions of the antenna being illustrated in broken lines.
Figure 3:
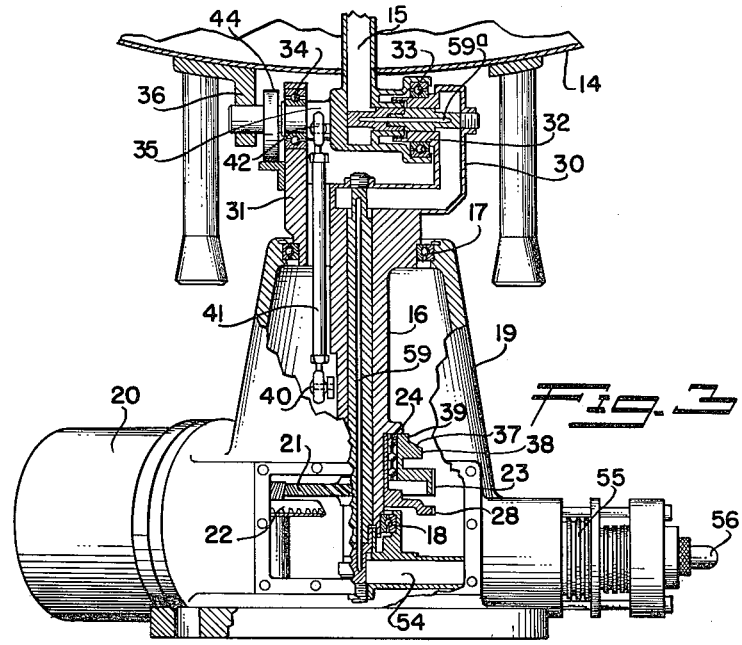
FIGURE 3 is a fragmentary view of the antenna driving mechanism with a portion thereof appearing in longitudinal cross section.

The antenna means 10 includes a dynamically balanced paraboloid reflector 14 having a typical feed horn 15, provided with radiating elements 16a therein. The reflector 14 is supported and driven to have a spiral motion in space, this movement being obtained by superimposing two rotary movements or motions. As best shown in FIGURES 2 and 3 the antenna means includes a main fore and aft spindle 16 rotatably carried by spaced bearings 17 and 18 in a housing 19. The spindle 16 is tubular to form a portion of a wave guide, as will be later described. A motor and speed reducing drive serves to rotate the spindle 16. This drive includes an electric motor 20 driving a gear 21 through speed reducing gearing 22. The gear 21 in turn meshes with a gear 23 freely rotatable on the spindle 16. The gears 21 and 23 are spiral or helical for the reason to be later described and the gear 23 is supported on the spindle 16 by an antifriction bearing 24 to have relative rotation and limited axial movement thereon. An idler gear 26 is fixed or keyed to a shaft 25 rotatably supported in the housing 19 and is driven by the gear 23. A gear 27 is fixed to a side of the gear 26 and meshes with a gear 28 fixed or keyed on the spindle 16. The spindle driving gear 27 has a slightly larger number of teeth than the gear 26 so that the spindle 16 is rotated at a somewhat greater rate than the helical gear 23, this relative rotation being employed to effect nodding or pivoting of the antenna 14 as it spins, as will be later described.

As best shown in FIGURE 3, the reflector 14 is supported at the outer end of the spindle 16 for angular movement or nodding about an axis normal to the axis of the spindle. The outer portion of the spindle 16 is thickened and has two spaced forwardly extending arms or branches 30 and 31. The branch 30, which is tubular, has a tubular boss 32 carrying a bearing 33 and the branch 31 carries an internal bearing 34. A transverse spindle or shaft 35 has one end portion carried in the intifriction bearing 34 and its other end is tubular or socketed to ride on the bearing 33. One or more lugs 36 attach the antenna reflector 14 to the transverse shaft 35. It will be seen that with this construction the reflector 14 is caused to rotate or spin with the spindle 16 and yet is free to be pivoted or nodded about a transverse axis, namely the axis of the shaft 35.

The means for pivoting or nodding the reflector 14 as it spins includes a cam 37 fixed to or integral with the above-mentioned spiral gear 23. This cam 37 is provided with two adjacent annular cam faces 38 and 39 and a cam follower or dog 40 is pivoted on the spindle 16 to be actuated or oscillated by either one of the cam faces. A rocker arm 41 has one end pivotally connected with the transverse antenna shaft 35 at 42. It will be seen that as the spindle 16 rotates to spin the reflector 14 a cam face 38 or 39 on the gear 23, turning at a slightly slower rate than the spindle 16, turns relative to the cam follower or dog 40 and thus actuates or pivots the dog. This in turn actuates the rod 41 to turn or pivot the reflector 14 about the axis of the transverse shaft 35. This pivoting of the reflector 14 is termed "nodding." As this nodding of the antenna occurs during spinning of the same, the antenna traverses a spiral path in space from a central or centralized position to a position 60 degrees from the centralized position and then back to the centralized position. The cam faces 38 and 39 are cut or contoured so that the nod motion of the antenna is non-linear to effect a substantially equal distribution of the transmitted energy from the antenna throughout the spiral cone motion of the full 120°. The non-linearity is such that the antenna is nodded or moved about the axis of the shaft 35 at a relatively fast rate as it approaches the center position and at a slower rate as it approaches or moves outward to the outer extremity of its nod motion. One or more helical springs 44 surround the nod shaft 35 and each has one end connected with the shaft and one end connected with a spindle branch 31 or 32 to urge the antenna towards its centralized position and thus maintain the cam follower or dog 40 in active cooperation with a cam face 38 or 39 at all times.

The antenna driving motor 20 is preferably a reversable three-phase A.C. motor which serves to rotate the antenna spindle 16 at approximately 750 r.p.m. The spindle driving and cam driving gearing is such that the gear 23 and cam 37 on the one hand and the antenna spindle assembly on the other hand have relative rotation at the rate of approximately one revolution every two seconds. The spirally moving antenna covers a field or volume in space of 120° centered about the zero fore and aft axis of the antenna. This 120° spiral motion is employed during the target searching mode or phase of operation. When the system is used to track a target more closely and/or to supply range information to a gunsight, or the like, a tracking mode or phase is utilized wherein the antenna scans through a field of, say, 20° centered about the same axis. To effect the change-over from the 120° spiral motion or range of scanning to the 20° phase of scanning, the system includes a motor reversing circuit illustrated in detail in FIGURE 9. Motor leads 45 extend from a three-phase A.C. power supply 46 and a motor energizing relay 47 controlled by a manual switch 48 is interposed in the motor leads 45 to control or initiate energization of the motor 20. A reversing switch 49 is connected in two of the leads 45 and is controlled or actuated by a relay 50. In practice any suitable or conventional reversing switch 49 may be employed. The energizing circuit 51 for the relay 50 has a manual switch 52 adapted to be closed to energize the relay. The arrangement is such that so long as the switch 52 remains open the motor 50 operates in what may be termed the "forward" direction and upon closing of the switch 52 the reversing switch 49 is actuated to cause operation of the motor 20 in the "reverse" direction. During the forward rotation of the motor 20 one end portion of the spiral gear 23 meshes with the motor driven gear 21 and the cam face 38 is in cooperation with the follower or dog 40 to produce the 120° spiral scan motion of the antenna. When the switch 52 is closed to reverse the motor 20 the helical or spiral gearing of the gears 21 and 23 causes the gear 23 and the cam 37 to move or slide to the position where the cam face 39 cooperates with the dog 40. This changes over the antenna operation from the 120° scan or mode to the 20° scan or phase.

Figure 4:
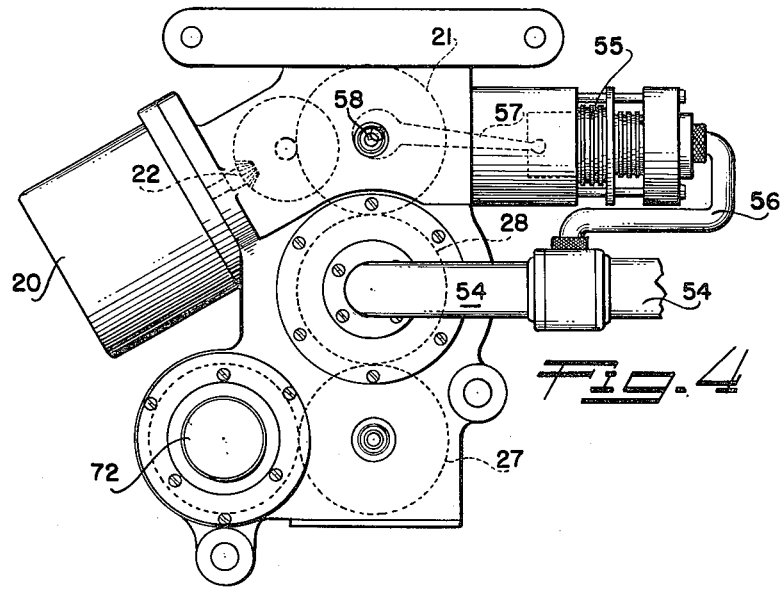
FIGURE 4 is a rear end view of the antenna drive unit and associated parts.

As mentioned above, the spindle 16 is tubular and the spindle branch 30 is also tubular and has communication with the interior of the spindle. The boss 32 of the spindle branch 30 is hollow or tubular and has communication with the antenna feed 15. The outer or rear end of the spindle 16 has communication with a wave guide 54 which extends to the transmitter-receiver group 11. The passages or interiors of the tubular spindle 16, branch 30 and boss 32 constitute a portion of the wave guide system leading to the feed horn 15. The wave guide passages and system of the antenna are preferably pressurized or supplied with compressed air as is conventional practice. I have shown an air compressor 55 on the housing 19 for supplying compressed air to the wave guide 54 through a pipe 56, see FIGURE 4. The compressor 55 is operated by an eccentric and crank rod mechanism 57 driven from the shaft 58 of the above described gear 21. If desired or found necessary, suitable dielectric rods or fillers 59 and 59a may be provided in the wave guide system of the spindle 16 and spindle branch 30. These dielectric rods are conventional in radar antenna units.

The receiver and transmitter group 11 includes a pulse generator 60 for generating the basic timing pulses for the radar, that is for establishing the synchronization of the timing of the pulses sent out through the radar antenna. The generator 60 is preferably of a multi-vibrator and pulse shaping network type well known in the art. The pulses from the generator 60 are fed to a modulator 61 through lines 62. The output of the modulator 61 constitutes high voltage pulses which are in synchronizism with the pulses generated by the basic pulse generator 60. The transmitter 63 of the transmitter and receiver group 11 includes as its basic transmitting element a pulse type magnetron which is of a type well known in the art. The pulses from the modulator 61 excite the magnetron-transmitter 63 to generate radio frequency energy at the pulse repetition rate and pulse duration established by the generator 60 and modulator 61. This radio frequency energy is fed from the transmitter 63 through a wave guide 64 to a duplexer 65 and thence out through the wave guide 54 and antenna. The receiver 66 of the receiver-transmitter group 11 is connected with the duplexer 65 by a wave guide 67 and the electronic switching means of the duplexer serves to protect the sensitive radar receiver 66 during the periods of operation of the transmitter 63. The reflected or "echo" energy from a target is received by the antenna means 10, passes back through the wave guide system of the antenna and wave guide 54 to the duplexer 65 and thence through the wave guide 67 to the receiver 66. The return or target echos are detected and amplified in the receiver 66 and then transmitted to the grid 68 of the cathode ray tube 70 where they may be displayed as visual signals.

The tube 70 may be any standard cathode ray tube indicator, for example a 5FP7. It will usually be preferred to employ a visual display storage tube or bright trace daylight storage type cathode ray tube of the type developed by the Radio Corporation of America under United States Army Signal Corps Contract Number W36–039–SC.44532.

In the normal search mode or phase of operation the pulse repetition rate of the system may be 1000 pulses per second with an overall pulse width of 1 microsecond. These pulses are amplified by the modulator 61 and fed to the magnetron-transmitter 63 where the energy is transformed into radio frequency which is discharged into space by the antenna 10, as above described. The target echoes come back through the antenna means 10, pass through the duplexer 65 into the receiver 66, which may be a standard balance mixer type receiver, to be detected and amplified through a 30 megacycle per second intermediate frequency amplifier for transmission to the grid 68 of the cathode ray tube 70. In the tracking mode or phase of operation of the system, when the switch 52 is closed, the electronic circuitry in the pulse generator 60 is altered and serves to change the pulse width to ½ microsecond. These pulses are fed to the modulator 61 and transmitter 63 in the same manner as the 1 microsecond pulses. The elements of the receiver-transmitter group 11, described above, may be standard or conventional and the frequency employed is in the X band with a nominal middle frequency of, say, 9,375 megacycles with frequency variation of plus or minus 300 megacycles. The modulator 61 may be a typical or conventional line type resonant charging modulator. The magnetron of the transmitter 63 may be similar to the 4J52 type and pre-settable to permit tuning over plus or minus 300 megacycles. The paraboloid reflector 14 in a typical application may be 24" in diameter. The radar energy fed from the antenna is horizontally polarized with the overall beam width between the half power points being approximately 4° and with the overall gain being about 33 db above an isotropic radiator.

The invention provides means for visually presenting on the cathode ray tube indicator 70 the range of any target shown thereon. This means includes a saw-tooth generator 71 receiving the above described pulses from the pulse generator 60, a resolver 72 receiving the saw-tooth voltage information from the generator 71 and suitable amplifiers 73 and 74 connected between the resolver 72 and the deflection coils 75 and 76 of the cathode ray tube. The above described leads or lines 62 carrying the pulse voltage from the generator 60 to the modulator 61 have branches 77 leading to the saw-tooth generator 71. The saw-tooth generator 71 operates to change the pulse information from the basic pulses generated at the generator 60 to saw-tooth type information, serving to produce a saw-tooth voltage with each pulse fed to it. Accordingly, a saw-tooth pulse is generated for each pulse which goes out through the transmitter 63 and antenna 10, as above described. The amplitude and time duration of this saw-tooth voltage is utilized by the invention to determine the overall sweep length and sweep timing displayed on the cathode ray tube indicator 70. During the search phase of operation of the system 1000 saw-tooth wave forms are generated each second at the generator 71 and during the tracking phases 1000 saw-tooth wave forms are generated each second at the generator.

The saw-tooth voltages which constitute sweep information are fed to the rotor 78 of the above mentioned resolver 72. This rotor 78 is a single winding and is rotated or driven in synchronism with the antenna spin spindle 16. The rotor 78 is driven by or secured on the shaft 25 to which the above described gear 26 is fixed. As the gear 26 is in mesh with the gear 23, and carries the gear 27 which meshes with the gear 28 to rotate the spindle 16 and antenna reflector 14 etc., the rotor 78 of the resolver 72 is rotated in synchronism with the spin motion of the antenna. The resolver 72 further includes two stationary stator windings 80 and 81. Circuits 82 and 83 extend from the resolver stators 80 and 81 to the deflection coils 75 and 76 respectively of the cathode ray tube indicator 70 and the abovementioned amplifiers 73 and 74 are interposed in these circuits. As the saw-tooth voltage pulses are fed to the resolver rotor 78 from the generator 71 sine and cosine voltages of the saw-tooth pulses are generated in the stators 80 and 81. In other words, the sine of the amplitude and shape of each saw-tooth voltage pulse is generated in one stator, say the stator 80, and the cosine of this same pulse is generated in the other stator 81. The invention employs these relatively small saw-tooth voltage-produced signals thus impressed on or generated in the stators 80 and 81 to determine the position of the sweep on the cathode ray tube indicator 70. The sine and cosine voltages from the stators 80 and 81 are amplified by their respective amplifiers 73 and 74 so as to be effective at the deflection coils 75 and 76 of the cathode ray tube 70. The cathode ray tube 70 is of the electromagnetic deflection type and the sine and cosine saw-tooth voltages supplied thereto as just described cause any sweep that is generated on the tube to be in synchronism with the position of the resolver rotor 78 which, in turn, is mechanically geared to the spinning antenna 10 to have at any given time a rotary position representative of the rotary position of the antenna. The stator windings 80 and 81 pick up the sine and cosine voltages fed to the rotor 78 by the saw-tooth generator 71. The saw-tooth voltages, that is the sine and cosine voltages, amplified and fed directly to the sine and cosine deflection coils 75 and 76 of the cathode ray tube indicator 70 faithfully reproduce and position any information fed to the resolver rotor 78. Such a voltage is fed or supplied to the tube 70 each time a pulse is fed into space from the antenna 10 so that a sweep is generated on the cathode ray tube 70 starting from the center of the tube and moving out to the edge thereof in time and distance which are both in synchronism with the input or basic saw-tooth voltage input. Accordingly, as the antenna spins and nods, a sweep is generated on the cathode ray tube indicator which rotates in synchronism with the spinning motion of the antenna. A pulse of energy is sent out into space from the antenna means 10 as each sweep on the tube 70 is generated and since the rate at which the sweep moves across the cathode ray tube 70 is in proportion to the rate at which the energy from the transmitter 63 goes out into space, and is returned or echoed back, any target information or echo that comes back to the radar system is fed to the receiver 66 and to the cathode ray tube 70 to be displayed in time and position in a given or known relation to the position of the antenna. In practice the effective range of the system of the present invention may be approximately 20 nautical miles.

In the operation of the system it is usually initially employed in the search phase or during searching maneuvers, at which time the antenna is operated, as above described, to cover a 120° conical area in space, rotating and nodding in a spiral manner. The sweep on the cathode ray tube 70 moves out from the center thereof to the outer extremity at a rate proportional to the overall range of the radar set which, in practice, may be 20 nautical miles. As explained above, the position of this sweep is determined by the position of the rotor 78 of the resolver 72 which is mechanically geared or coupled with the spin spindle 16 of the antenna 10. Now referring to FIGURES 5, 6, 7 and 8, the arrow in FIGURE 5 indicates the direction of rotation of the sweep on the face of the tube and the line 90 represents the sweep. In FIGURE 6, a target has appeared on the face of the tube, the target being designated 91. The target 91 is shown in FIGURE 6 to be above and to the right of the center of the scope or tube face, the pilot or observer's airplane being denoted by the center of the scope. The cathode ray tube scope is provided with cross lines 92 which, in turn, have radially spaced intersecting lines 93. Where the operative range of the radar system is 20 nautical miles, each of these intersecting lines may represent 5 nautical miles. Accordingly, the representation of the target as shown at 91 in FIGURE 6, indicates that the actual target is approximately 12 miles from the pilot's aircraft and as the representation on the tube is to the right of its center the actual target is known to be to the right of the pursuing craft. Furthermore, as the target representation 91 is spaced above the horizontal cross line 92, the actual target is known to be above and to the right of the pursuing craft. Normally the pilot of the pursuing airplane will maneuver so as to roll to the right and to climb in order to "boresight" or follow the target. When this is done the target representation 91 appears on the upper portion of the tube 70 or scope and assuming that the pursuing craft is closing in on the actual target, the target representation appears closer to the center of the scope and adjacent the intersecting line 93 representing a range of 10 miles. In FIGURES 5, 6 and 7, the ground echo or return is represented at 94 for when the spinning and nodding antenna reflector 14 is directed in the downward direction the ground return or ground echos are "painted" or represented on the lower portion of the cathode ray tube 70. When the pilot has maneuvered, as above described, the ground return 94 will have revolved on the face of the tube 70 to a position such as shown in FIGURE 7. This representation 94 of the ground provides the pilot with a very accurate artificial horizon to facilitate his search tracking and combat maneuvers. If the pilot is successful in bringing the actual target into an approximate boresight position, in other words by bringing the tracking airplane to a course where the target is within one beam width, or approximately 4°, the echoes from the target will result in a circular representation 95 on the face of the cathode ray tube 70 since the target will be "illuminated" in all of the axial rotational positions of the antenna as it is "looking" straight forward. In other words, the echoes from the actual target provide target range information and target position information continuously so that the target representation instead of being a dot or pip on the tube 70 appears as the circle 95. Then if the pursuing pilot maneuvers his craft so as to maintain the circle 95 and continues to approach the actual target, the target range reduces until the target is within the range of actual visual detection where the final terminal tracking and weapon firing are done visually or optically. In practice, when the target is boresighted at, say, a distance or range of, say, 10 miles, the switch 52 is closed. This brings the antenna scan to the 20° motion and the radar "locks on" the target in respect to range. For the final terminal tracking and "kill" the radar information may be fed into a U.S.A.F. A4 or K19 gun-bomb-rocket sight. The final terminal tracking may be accomplished by optical tracking in the sight.

Having described only typical forms of the invention I do not wish to be limited to the specific details herein set forth, but wish to reserve to myself any variations or modifications that may appear to those skilled in the art and fall within the scope of the following claims:

I claim:

1. A search and tracking radar system for use on a vehicle comprising antenna means, means selectively rotating the antenna means in either direction about an axis extending fore and aft of the vehicle at a known rate, means for nodding the antenna means about an axis transverse the axis of rotation of the same and automatically changing the amplitude of the nodding in response to changing the direction of rotation of said antenna means, a radio frequency transmitter, a receiver, a wave guide system connected between the antenna means and the transmitter and receiver, a pulse generator producing repetitive timed voltage pulses, circuit means feeding said pulses to the transmitter so that the latter feeds pulsed radio frequency energy to the antenna means for release therefrom into space, a cathode ray tube having a grid electrically connected with the receiver to receive target echo voltages therefrom and having deflection coils, a saw-tooth pulse generator receiving pulses from the first named generator and converting them to voltage pulses of saw-tooth form, a resolver including a rotor driven in synchronism with the rotation of the antenna means and receiving said saw-tooth voltages, and two stator windings generating the sine and cosine functions of the saw-tooth pulses, and electrical connections between said stator windings and the deflection coils of said tube whereby the sine and cosine saw-tooth voltages are impressed on the deflection coils causing echo signals to be displayed on the tube in given time and position relation with respect to the position of the antenna.

2. A search and tracking radar system for installation on a vehicle comprising a movable antenna including a reflector and horn, means for spinning the antenna at a given rate in either direction about an axis extending fore and aft of the vehicle and for nodding the antenna about an axis normal to the first mentioned as it spins, said means including a cam automatically movable in response to changing the direction of rotation of said antenna for changing the nodding amplitude and performing both search and tracking functions, an RF transmitter, an RF receiver, a wave guide system between the antenna and the transmitter and receiver, a pulse generator producing repetitive timed pulses, a circuit feeding said pulses to the transmitter so that pulsed RF energy is released into space at the antenna and echo energy is received by the antenna and receiver, a cathode ray tube having a grid connected with the receiver to receive echo signals therefrom and having two deflection coils, a saw-tooth pulse generator connected with the first named generator to convert said timed pulses into saw-tooth voltage pulses, a resolver including a rotor coil rotated in synchronism with the spinning antenna and electrically connected with the saw-tooth generator to receive the pulses therefrom, and two stator windings, one generating functions of the sine of the amplitude and shape of the saw-tooth voltages, the other generating functions of the cosine of the amplitude and shape of these voltages, and an electrical connection between one stator winding and one deflection coil, and an electrical connection between the other stator winding and the other deflection coil, said connections supplying the sine and cosine functions of the pulses to the deflection coils to cause the echo information to be displayed on the tube in given time and position relation with respect to the antenna position.

3. In a radar system to be carried by a vehicle and having a movable antenna means and a RF transmitter and receiver group associated with the antenna means the combination of; a cathode ray tube having a grid connected with the receiver and having two deflection coils, a generator delivering repetitive timed voltage pulses to the transmitter, a resolver including a rotor coil and two stator coils, means for rotating the rotor coil and antenna in synchronism in either direction about an axis extending fore and aft of the vehicle and for nodding the antenna about an axis transverse of the fore and aft axis as it rotates, said means including a device automatically changing the amplitude of the nodding in response to changing the direction of rotation of said antenna, a saw-tooth generator receiving said voltages from the first named generator and converting them into saw-tooth form voltage pulses, a circuit carrying said saw-tooth voltage pulses to said rotor coil whereby a function of the sine thereof is generated in one of said stator coils and a function of the cosine thereof is generated in the other stator coil, and a circuit from one stator coil to one deflection coil of said tube and a circuit from the other stator coil to the other deflection coil whereby the sine and cosine functions of said pulses are fed to the tube so that echo information is displayed on the sweep of the tube in known time and position relation with respect to the antenna.

4. In a radar system the combination of; a cathode ray tube indicator having a signal responsive grid and two deflection coils, a movable antenna, a resolver having a rotor coil and two stator coils, a motor means for rotating the antenna in either direction about its line of sight axis means responsive to the last mentioned means for nodding the antenna about an axis normal to the first named axis as the antenna rotates and at either of two amplitude modes depending upon the direction of antenna rotation, means for rotating said rotor coil in synchronism with the rotation of the antenna, means for supplying saw-toothed voltage pulses to said rotor coil whereby a function of the sine thereof is generated in one of said stator coils and a function of the cosine thereof is generated in the other stator coil, and electrical connections between the stator coils and the deflection coils whereby said sine and cosine functions of said pulses are impressed on the deflection coils.

5. In a radar system for use on a high speed vehicle including a movable antenna means, an RF transmitter and receiver group associated with the antenna means, a cathode ray tube having a grid connected with the receiver and having two deflection coils, a generator delivering repetitive timed voltage pulses to the transmitter, a resolver including a rotor coil and two stator coils, means for rotating the antenna in either direction about an axis extending fore and aft of the vehicle and for nodding the antenna about an axis normal to the first mentioned axis at either of two amplitude modes depending on the direction of rotation as it rotates, means for rotating the rotor coil in synchronism with the antenna, a saw-tooth generator receiving said voltages from the first named generator and converting them into saw-tooth form voltage pulses, a circuit carrying said saw-tooth voltage pulses to said rotor coil whereby functions of the sine thereof are generated in one of said stator coils and functions of the cosine thereof are generated in the other stator coil, and a circuit from one stator coil to one deflection coil and a circuit from the other stator coil to the other deflection coil whereby the sine and cosine functions of said pulses are fed to the tube so that echo information is displayed on the sweep of the tube in known time and position relation with respect to the antenna, each of said circuits from said stator coils including an amplifier.

6. In a radar system for use on a vehicle and having a movable antenna means including a reflector and horn and an RF transmitter and receiver group associated with the antenna means the combination of; a cathode ray tube having a grid connected with the receiver and having two deflection coils, a generator delivering repetitive timed voltage pulses to the transmitter, a resolver including a rotor coil and two stator coils, a motor means for rotating the antenna means in either direction about an axis extending fore and aft of the vehicle, means responsive to the motor means for nodding the antenna means at one amplitude mode about an axis normal to its axis of rotation as it rotates in one direction and at another amplitude mode as it rotates in the opposite direction, a mechanical drive between the antenna rotating means and said rotor coil whereby the coil is rotated at a given rate with respect to the rotation of the antenna means, a saw-tooth generator for converting pulses from the first named generator into saw-tooth voltage pulses, a circuit feeding the saw-tooth voltages to said rotor coil whereby functions of the sine thereof are generated in one of said stator coils and functions of the cosine of said voltages are generated in the other stator coil, and a circuit from one stator coil to one deflector coil and a circuit from the other stator coil to the other deflector coil whereby the sine and cosine functions of said saw-tooth voltages are fed to said tube to cause echo information to be displayed on the sweep in determinable time and position relation with respect to the antenna position.

7. In a radar system for use on a vehicle and having a movable antenna means and an RF transmitter and receiver group associated with the antenna means the combination of; a cathode ray tube having a grid connected with the receiver and having two deflection coils, a generator delivering repetitive timed voltage pulses to the transmitter, a resolver including a rotor coil and two stator coils, a motor means for rotating the antenna means in either direction about an axis extending fore and aft of the vehicle, means responsive to the motor means for nodding the antenna means at one amplitude mode about an axis normal to its axis of rotation as it rotates in one direction and at another amplitude mode as it rotates in the opposite direction, a mechanical drive between the antenna rotating means and said rotor coil whereby the coil is rotated at a given rate with respect to the rotation of the antenna means, a saw-tooth generator for converting pulses from the first named generator into saw-tooth voltage pulses, a circuit feeding the saw-tooth voltages to said rotor coil whereby a function of the sine thereof is generated in one of said stator coils and a function of the cosine of said voltages is generated in the other stator coil, and a circuit from one stator coil to one deflector coil and a circuit from the other stator coil to the other deflector coil whereby said sine and cosine functions of said saw-tooth voltages are fed to said tube to cause echo information to be displayed on the sweep of the tube in determinable time and position relation with respect to the antenna position.

8. A radar antenna mount for spiral scan type radar devices comprising, a frame, a first member carried by said frame for rotation about one axis, a second member swingably carried by the first member and supporting the antenna for limited movement about an axis arranged transversely of said one axis, drive means engaging said first member and selectively effecting rotation thereof in either direction to spin the antenna, a cam rotatably carried on said first member and having limited axial movement relative to the first member, said cam having a plurality of cam surfaces, cam follower means secured to said second member and arranged to engage one of the plurality of cam surfaces depending upon the relative axial position of the cam, and coupling means operatively connecting said cam to said drive means and effecting rotation thereof for nodding the antenna about the transverse axis at an amplitude determined by the shape of the cam surface, said coupling means being responsive to a change in the direction of rotation of said first member for automatically effecting axial movement of said cam to shift the cam follower into engagement with another of the plurality of cam surfaces and thereby change the nodding amplitude.

References Cited in the file of this patent

UNITED STATES PATENTS

| | | |
|---|---|---|
| 2,395,966 | Goldberg | Mar. 5, 1946 |
| 2,409,456 | Tolson et al. | Oct. 15, 1946 |
| 2,410,666 | Leck | Nov. 5, 1946 |
| 2,437,275 | Skene et al. | Mar. 9, 1948 |
| 2,444,193 | Gillette et al. | June 29, 1948 |
| 2,518,968 | Wolff | Aug. 15, 1950 |
| 2,543,188 | Moseley | Feb. 27, 1951 |
| 2,617,982 | Holschuh et al. | Nov. 11, 1952 |
| 2,651,721 | Bergey et al. | Sept. 8, 1953 |
| 2,835,892 | Szekely | May 20, 1958 |

OTHER REFERENCES

Volume 22, M.I.T. Radiation Laboratory Series, "Cathode Ray Tube Displays," by Soller et al., 1948, McGraw-Hill Book Co., Inc., New York, N.Y., pp. 22–23, 243–247.